United States Patent
Zhao et al.

(10) Patent No.: US 11,109,602 B2
(45) Date of Patent: *Sep. 7, 2021

(54) NANO-CELLULOSE COATINGS TO PREVENT DAMAGE IN FOODSTUFFS

(71) Applicant: Oregon State University, Corvallis, OR (US)

(72) Inventors: Yanyun Zhao, Beaverton, OR (US);
John Simonsen, Corvallis, OR (US);
George Cavender, Lincoln, NE (US);
Jooyeoun Jung, Lincoln, NE (US);
Leslie H. Fuchigami, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,037

(22) Filed: May 14, 2019

(65) Prior Publication Data

US 2020/0008435 A1    Jan. 9, 2020

Related U.S. Application Data

(60) Continuation of application No. 15/794,941, filed on Oct. 26, 2017, now Pat. No. 10,334,863, which is a
(Continued)

(51) Int. Cl.
*A23B 7/154* (2006.01)
*A23L 3/3463* (2006.01)
(Continued)

(52) U.S. Cl.
CPC ............... *A23B 7/154* (2013.01); *A23B 7/16* (2013.01); *A23L 3/3463* (2013.01); *C09D 101/02* (2013.01)

(58) Field of Classification Search
None
See application file for complete search history.

(56) References Cited

U.S. PATENT DOCUMENTS 4,572,906 A    2/1986 Sparkes et al.
4,783,342 A    11/1988 Polovina
(Continued)

FOREIGN PATENT DOCUMENTS

CN    1212067    7/2005
EP    1 654 933    5/2006
(Continued)

OTHER PUBLICATIONS

Marathe, Development of Controlled Release Antimicrobial Films From Low Methoxyl Pectin (Year: 2008).*
(Continued)

*Primary Examiner* — Stephanie J Cohen
(74) *Attorney, Agent, or Firm* — Klarquist Sparkman, LLP

(57) ABSTRACT

Disclosed herein are embodiments of a composition for use in forming films or coatings that prevent damage in foodstuffs, including plants, fruits, and vegetables. The disclosed compositions comprise a cellulose nanomaterial and can further comprise a nanoscale mineral compound and one or more additional components. Also disclosed are films or coatings made using the disclosed compositions, as well as methods for making the disclosed compositions and methods for using the disclosed compositions.

19 Claims, 7 Drawing Sheets
(5 of 7 Drawing Sheet(s) Filed in Color)

Related U.S. Application Data division of application No. 14/214,145, filed on Mar. 14, 2014, now Pat. No. 9,826,750.

(60) Provisional application No. 61/784,060, filed on Mar. 14, 2013.

(51) Int. Cl.
*A23B 7/16* (2006.01)
*C09D 101/02* (2006.01)

(56) References Cited

U.S. PATENT DOCUMENTS

| | | | |
|---|---|---|---|
| 5,047,180 | A | 9/1991 | Steiner et al. |
| 6,060,521 | A | 5/2000 | Sekutowski et al. |
| 6,162,475 | A | 12/2000 | Hagenmaier et al. |
| 6,287,278 | B1 | 9/2001 | Waldman et al. |
| 6,312,669 | B1 | 11/2001 | Cantiani |
| 6,548,170 | B2 | 4/2003 | Perrier et al. |
| 6,703,340 | B2 | 3/2004 | Yang et al. |
| 6,730,340 | B1 * | 5/2004 | Macquarrie ........ A22C 13/0013 426/105 |
| 6,857,224 | B1 | 2/2005 | Kammereck et al. |
| 7,105,229 | B2 | 8/2006 | Anderson |
| 7,153,353 | B2 | 12/2006 | Ichinohe |
| 7,157,113 | B2 | 1/2007 | MacHielse et al. |
| 7,160,580 | B2 | 1/2007 | Hettiasrachchy et al. |
| 7,222,455 | B2 | 5/2007 | Schrader |
| 8,752,328 | B2 | 6/2014 | Kaiser et al. |
| 2004/0077498 | A1 | 4/2004 | Lynch |
| 2005/0113255 | A1 | 5/2005 | Schrader et al. |
| 2006/0252649 | A1 | 11/2006 | Pluta et al. |
| 2007/0037711 | A1 | 2/2007 | Pluta et al. |
| 2007/0135312 | A1 | 6/2007 | Melbouci |
| 2007/0190097 | A1 | 8/2007 | Schrader |
| 2009/0196908 | A1 * | 8/2009 | Lee ...................... A61K 9/0056 424/443 |
| 2011/0036522 | A1 | 2/2011 | Ankerfors et al. |
| 2011/0198282 | A1 * | 8/2011 | Chu ......................... D01F 2/24 210/500.29 |
| 2011/0223401 | A1 | 9/2011 | Harlin et al. |
| 2012/0015852 | A1 | 1/2012 | Quintero et al. |
| 2012/0042420 | A1 | 2/2012 | Kaiser et al. |
| 2012/0043039 | A1 | 2/2012 | Paltakari et al. |
| 2012/0153214 | A1 | 6/2012 | Boluk et al. |
| 2013/0061774 | A1 | 3/2013 | Landry et al. |
| 2014/0272013 | A1 | 9/2014 | Zhao et al. |
| 2016/0002483 | A1 | 1/2016 | Zhao et al. |

FOREIGN PATENT DOCUMENTS

| | | | | |
|---|---|---|---|---|
| EP | | 1654933 A1 * | 5/2006 | ............... A23B 7/16 |
| WO | WO 2009/064450 | | 5/2009 | |
| WO | WO 2010/066036 | | 6/2010 | |
| WO | WO 2011/047047 | | 4/2011 | |
| WO | WO 2011/13749 | | 11/2011 | |
| WO | WO 2011/141877 | | 11/2011 | |
| WO | WO-2013/009253 | | 1/2013 | |
| WO | WO 2013/061266 | | 5/2013 | |

OTHER PUBLICATIONS

Kim et al, dispersion of cellulose crystallites by non-ionic surfactants in a hydrophobic polymer matrix. Polymer Engineering and science, pp. 2054-2060 (Year: 2009).*

George et al, high performance edible nanocomposite films containing bacterial cellulose nanocrystals, 2012, carbohydrate polymers, vol. 87, pp. 2031-2037 (Year: 2012).*

Andrade et al, atomizing spray systems for application of edible coatings. comprehensive reviews in food science and food safety, vol. 11, issue 3, pp. 323-337 (Year: 2012).*

Andrade et al., "Atomizing Spray Systems for Application of Edible Coatings," *Comprehensive Reviews in Food Science and Food Safety*, vol. 11, pp. 323-337, Apr. 9, 2012.

Aulin et al., "Oxygen and oil barrier properties of microfibrillated cellulose films and coatings," *Cellulose*, 17(3): 559-574, Jan. 10, 2010.

Azeredo et al., "Edible films from alginate-acerola puree reinforced with cellulose whiskers," *LWT—Food Science and Technology*, 46:294-297, 2012.

Azeredo et al., "Nanocellulose Reinforced Chitosan Composite Films as Affected by Nanofiller Loading and Plasticizer Content," *Journal of Food Science*, 75(1): N1-N7, 2010.

Azeredo et al., "Nanoreinforced alginate-acerola puree coatings on acerola fruits," *Journal of Food Engineering*, 113:505-510, Aug. 11, 2012.

Baldwin, "Surface treatment and edible coatings in food preservation," *Handbook of Food Preservation*, Boca Raton, LA, USA, CRC Press, Chapter 21, pp. 477-507, 2007.

Belbekhouche et al., "Water sorption behavior and gas barrier properties of cellulose whiskers and microfibrils films," *Carbohydrate Polymers*, 83(4): 1740-1748, Feb. 1, 2011.

Bilbao-Sanz et al., "Composite Edible Films Based on Hydroxypropyl Methylcellulose Reinforced with Microcrystalline Cellulose Nanoparticles," *J. Agric. Food Chem.*, 2010, 58(6), pp. 3753-3760, Feb. 25, 2010.

Brown et al., "Effects of copper-calcium sprays on fruit cracking in sweet cherry (*Prunus avium*)," *Scientia Horticulturae*, 62:75-80, Apr. 1995.

Casariego et al., "Chitosan coating surface properties as affected by plasticizer, surfactant and polymer concentrations in relations to the surface properties of tomato and carrot," *Food Hydrocolloids*, 22(8): 1452-1459, Dec. 2008.

Chen et al., "Dispersion Process and Effect of Oleic Acid on Properties of Cellulose Sulfate-Oleic Acid Composite Film," *Materials*, vol. 8, pp. 2346-2360, Apr. 30, 2015.

Choi et al., "Wettability of chitosan coating solution on 'Fuji' apple skin," *Journal of Food Science*, 67(7): 2668-2672, Sep. 2002.

De Moura et al., Microfluidizer Technique for Improving Microfiber Properties Incorporated Into Edible and Biodegradable Films, *Advances in Microfluidics*, Dr. Ryan Kelly, Ed., Chapter 10, pp. 219-240, Mar. 2012.

Deng et al., "Development, characterization, and validation of chitosan adsorbed cellulose nanofiber (CNF) films as water resistant and antibacterial food contact packaging," *LWT—Food Science and Technology*, vol. 83, pp. 132-140, May 13, 2017.

Fakhouri et al., "Effect of a gelatin-based edible coating containing cellulose nanocrystals (CNC) on the quality and nutrient retention of fresh strawberries during storage," *IOP Conf. Series: Materials Science and Engineering*, 2014, 64, 012024, Aug. 22, 2014, (7 pages: doi:10.1088/1757-899X/64/1/012024).

George et al., "High performance nanocomposite films containing bacterial cellulose nanocrystals," *Carbohydrate Polymers*, 87(3): 2031-2037, Oct. 14, 2011.

International Search Report and Written Opinion issued for International Application No. PCT/US2014/029611 dated May 19, 2014.

International Search Report and Written Opinion issued for International Application No. PCT/US2018/016021 dated Mar. 29, 2018.

Jahit et al., "Preparation and physical properties of gelatin-CMC/chitosan composite films as affected by drying temperature," *International Food Research Journal*, 23(3): 1068-1074, 2016.

Jiang et al., "Effect of chitosan coating on postharvest life and quality of longan fruit," *Food Chemistry*, 73:139-143, Apr. 3, 2001.

Jung et al. "Investigation of the Mechanisms of Using Metal Complexation and Cellulose Nanofiber/Sodium Alginate Layer-by-Layer Coating for Retaining Anthocyanin Pigments in Thermally Processed Blueberries in Aqueous Media," *Journal of Agricultural and Food Chemistry*, 63(11): pp. 3031-3038, Mar. 16, 2015.

Kaiser et al., "A Review of Cherry Fruit Cracking," http://extension.oregonstate.edu/umatilla/mf/sites/default/files/VWA_State_Cherry_Cracking_Kaiser_Dec_07, published on-line at least as early as Dec. 2007 (26 pages).

(56) References Cited

OTHER PUBLICATIONS

Khan et al., "Mechanical and barrier properties of nanocrystalline cellulose reinforced chitosan based nanocomposite films," *Carbohydrate Polymers*, vol. 90, pp. 1601-1608, Jul. 16, 2012.

Khan et al., "Production and properties of Nanocellulose-Reinforced Methylcellulose-Based Biodegradable Films," *Journal of Agricultural and Food Chemistry*, vol. 58, pp. 7878-7885, Jun. 15, 2010.

Lacroix et al., "Edible films and coatings from non-starch polysaccharides," *Innovations in Food Packaging*, ed. Han, 2005.

Maftoonazad et al., "Postharvest shelf life of avocados using methyl cellulose-based coating," *LWT*, 38: 617, 624, Nov. 17, 2004.

Maqbool et al., "Effect of a novel edible composite coating based on gum Arabic and chitosan on biochemical and physiological responses of banana fruits during cold storage," *Journal of Agricultural and Food Chemistry*, 59(10): 5474-5482, Apr. 8, 2011.

Marathe, *Development of Controlled Release Antimicrobial Films from Low Methoxyl Pectin*, Thesis submitted to the Rutgers, The State University of New Jersey, Jan. 2008.

Marpudi et al., "Enhancement of storage life and quality maintenance of papaya fruits using aloe vera based antimicrobial coating," *Indian Journal of Biotechnology*, vol. 10, 6 pages, Jan. 2011.

Martinez-Romero et al., "Postharvest sweet cherry quality and safety maintenance by Aloe vera treatment: A new edible coating," *Postharvest Biology and Technology*, 39(1): 93-100, 2006.

Morris, "Synthesis of an Antimicrobial Textile Coating," Department of Chemistry and Biochemistry, California Polytechnic State University, 2011.

Nabifarkhani et al., "Effect of nano-composite and Thyme oil (*Tymus vulgaris* L) coating on fruit quality of sweet cherry (Takdaneh Cv) during storage period," *Food Science & Nutrition*, May 10, 2015 (6 pages, doi:10.1002/fsn3.226).

Pilon et al., "Chitosan nanoparticle coatings reduce antimicrobial growth on fresh-cut apples while not affecting quality attributes," *Int. J. Food Science and Tech.*, 2015, 50, 440-448, Jul. 15, 2014.

Ruiz-Ramos et al., "Interrelationship between the viscoelastic properties and effective moisture diffusivity of emulsions with the water vapor permeability of edible films stabilized by mesquite gum-chitosan complexes," *Carbohydrate Polymer*, 64(2): 355-363, May 11, 2006.

Schrader et al., "Stress-Induced Disorders: Effects on Apple Fruit Quality," *WSU-TFREC Postharvest Information Network*, Dec. 2003, 7 pages.

Togrul et al., "Extending shelf-life of peach and pear by using CMC from sugar beet pulp cellulose as a hydrophilic polymer in emulsions," *Food Hydrocolloids*, 18:215-226, May 29, 2003.

Tzoumaki et al., "Impact of edible coatings and packaging quality of white asparagus. (*Asparagus officinalis*, L.) during cold storage," *Food Chemistry*, 117(1): 55-63, Nov. 1, 2009.

Vina et al., "Effects of polyvinylchloride films and edible starch coatings on quality aspects of refrigerated Brussels sprouts," *Food Chemistry*, 103(3): 701-709, 2007.

Wang et al., "Assessment of film-forming potential and properties of protein and polysaccharide-based biopolymer films," *International Journal of Food Science and Technology*, 42(9): 1128-1138, Jun. 26, 2007.

Yaman et al., "Effects of an edible coating and cold storage on shelf-life and quality of cherries, LWT," *Food Science and Technology*, 35(2): 146-150, Mar. 2002.

Azeredo et al., "Nanocomposite edible films from mango puree reinformed with cellulose nanofibers," *Nanoscale Food Science, Engineering, and Technology*, 74(5): N31-N35, 2009.

Correa, "Riqueza Quimica Del Mango" *Revista Universidad Y Eafit*, 27(83): 77-82, Aug. 27, 2012.

Hasan, "Development of Chitosan Based Film Enhanced with Nanocellulose Fibre Extracted from Oil Palm Empty Fruit Bunch (OPEFB)," Thesis submitted in fulfillment of requirement for award of degree Bachelor of Engineering, Jul. 5, 2013, 17 Pages (Pages ii, vi-viii, ix-xi, 51-60).

Jung et al., "Development and preliminary field validation of water-resistant cellulose nanofiber based coatings with high surface adhesion and elasticity for reducing cherry rain-cracking," *Scientia Horiculturae*, No. 200, pp. 161-169, Jan. 23, 2016.

Khuwijitjaru et al. "Preparation of finely dispersed O/W emulsion from fatty acid solubilized in subcritical water," *Journal of Colloid and Interface Science*, 278 (2004) 192-197, Jun. 19, 2004.

Lalel et al., "Maturity stage at harvest affects fruit ripening, quality and biosynthesis of aroma volatile compounds in 'Kensington Pride' mango," *The Journal of Horticultural Science and Biotechnology*, 78(2): 225-233, 2003.

Sagitani et al. "Making Homogenous and Fine Droplet 0/W Emulsions Using Nonionic Surfactants," *JAOCS*, Jun. 1981.

Shibahara et al., "cis-Vaccenic acid in mango pulp lipids," *Lipids*, 21(6): 388-394, Jun. 1986.

Vigneshwaran et al., "Effect of gum arabic on distribution of nanocellulose fillers in starch film," *Appl. Nanosci.*, vol. 1, pp. 137-142, Aug. 24, 2011.

Vu et al., "Development of edible bioactive coating based on modified chitosan for increasing the shelf life of strawberries," *Food Research International*, 44(1): 198-203, Oct. 29, 2010.

\* cited by examiner

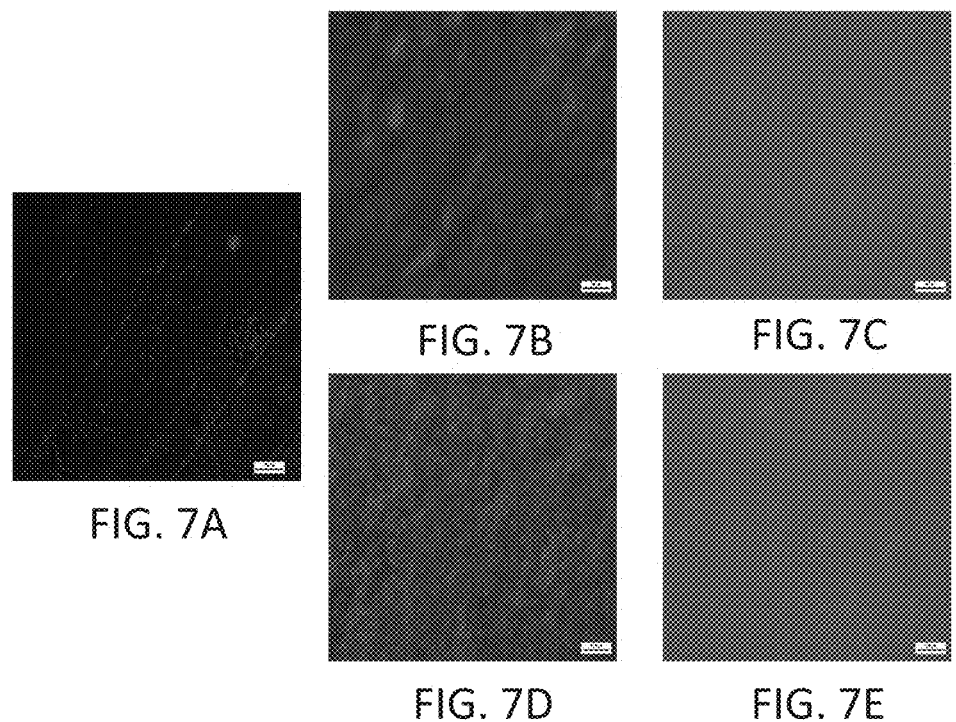
FIG. 7A
FIG. 7B
FIG. 7C
FIG. 7D
FIG. 7E
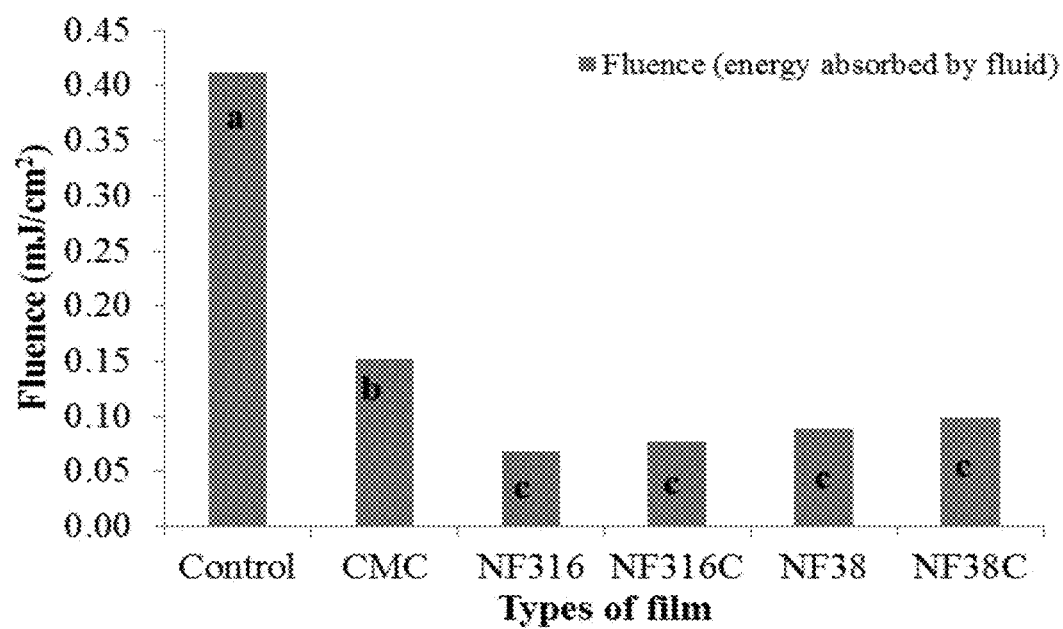
FIG. 8

NANO-CELLULOSE COATINGS TO PREVENT DAMAGE IN FOODSTUFFS

CROSS REFERENCE TO RELATED APPLICATIONS

This is a continuation of U.S. application Ser. No. 15/794,941, filed Oct. 26, 2017, which is a division of U.S. application Ser. No. 14/214,145, filed Mar. 14, 2014, now U.S. Pat. No. 9,826,750, which claims the benefit of U.S. Provisional Application No. 61/784,060, filed Mar. 14, 2013; each of these prior applications is hereby incorporated herein by reference in its entirety.

FIELD

This disclosure relates to the field of protective, edible coatings for food or foodstuffs, such as plants, fruits, vegetables. It further relates to compositions suitable as protective coatings and methods of making and applying these compositions.

BACKGROUND

Finding acceptable coatings for foods, such as fresh fruits, vegetables, cheeses, bakery goods, raw and cooked eggs, fresh and processed meat and seafood products is a challenging task. The desired coating would be edible and once applied would act as a barrier to moisture, gases and/or UV light, and undesirable microorganisms. However, several other criteria must also be met. The coating must be completely harmless to consumers, transparent, or nearly so, in the visible region so the product is visible to the consumer, and impart no significant odor or taste to the foods. In addition, edible coatings that offer promise as packaging materials due to one or more unique functional properties often suffer from reduced water resistance (highly water soluble). Satisfying all these criteria simultaneously and satisfactorily has presented a serious challenge to researchers and as yet no suitable solution has been found.

Anthocyanins provide the majority of red, purple, and blue pigmentation of fruits, and their greater consumption has been suggested to mitigate the risk of chronic disease in humans. Unfortunately, these pigments are highly labile and vulnerable to degradation during thermal processing. Further complicating matters is their water-solubility that promotes their leaching into aqueous media. Thus, innovative technologies are needed to overcome long-standing technical barriers experienced by the food industry to retain these health-promoting pigments during crop production, harvesting, handling and processing.

Fresh produce (fruits and vegetables) and plants in general commonly lose water to their surroundings during production, harvesting, handling and storage. This water loss can cause damage, dieback, and death to plants in general, as well as changes in the appearance, texture and quality of the produce, which most consumers find unappealing. This results in a decreased marketability, and limits acceptable shelf-life and storage times.

Exposure to high levels of UV light can damage developing and maturing produce creating visibly damaged and discolored tissues, destroying native healthful phytochemical compounds, stimulating production of undesirable and harmful compounds like ethylene gas, and providing a foothold for spoilage organisms to grow. Such produce suffers a loss of perceived quality, reduced health benefits and generally deemed unsuitable for the fresh market. Further, the phenomenon can potentially ruin a grower economically, as the conditions leading to its occurrence are shared by the entire crop.

Previously frozen foods typically exude liquid during thawing, resulting in a phenomenon called "drip loss." This can be off-putting to consumers, and can change the overall composition of the thawed product, making it behave differently from fresh during preparation/cooking. Drip loss also can cause economic losses to the processors.

SUMMARY

This invention utilizes a material, nanocellulose (which has not previously been used as an edible coating), alone or in combination with nano calcium carbonate for the protection from moisture loss and UV damage of plant tissues and organs in general and fresh fruits and vegetables both pre- and post-harvest and also as a barrier coating for other fresh and processed foods for preventing leaching of functional food substances, such as anthocyanins and other water soluble compounds, as well as loss and/or gain of moisture and gases (e.g. $H_2O$, $O_2$, and $CO_2$) during food processing and storage.

Disclosed herein are embodiments of a composition, comprising a cellulose nanomaterial in an amount selected from 0.188%, 0.375%, 0.75%, or 1%, and 0.1% of a nanoscale mineral compound. Embodiments of the composition are edible. The composition may further comprise a phenolic compound, a crosslinking agent, an acid, a metal ion, or combinations thereof. In other embodiments, the composition may further comprise a film-forming material, a plasticizer, an antimicrobial agent, an antioxidant agent, or combinations thereof.

The cellulose nanomaterial may be selected from cellulose nanofibrils, cellulose nanocrystals, or a combination thereof. In some embodiments, a portion of the cellulose nanomaterial may comprise cellulose microfibrils, cellulose microcrystals, or a combination thereof. The disclosed nanoscale mineral compound can be nano-calcium carbonate. Suitable film-forming materials include chitosan, a protein, fruit or vegetable puree, or combinations thereof.

In some embodiments, the composition may comprise a cellulose nanomaterial in an amount selected from 0.188%, 0.375%, 0.75%, or 1%; 0.1% of a nanoscale mineral compound; and a crosslinking agent, wherein the composition is formulated for preventing or mitigating pre- and/or post-harvest damage in a plant, fruit, vegetable, or part thereof. The composition may be formulated for preventing or mitigating leaching of anthocyanins, nutrients, pigments, or combinations thereof from the plant, fruit, vegetable, or part thereof. The composition also may be formulated for preventing or mitigating weight loss and UV damage of the plant, fruit, vegetable, or part thereof.

Also disclosed herein is a plant, fruit, vegetable, or part thereof, comprising a film formed from the composition embodiments disclosed herein. The plant, fruit, vegetable or part thereof can be substantially coated with the composition. In some embodiments, the fruit is a blueberry, a cherry, or an apple. The plant, fruit, vegetable, or part thereof that is coated with the composition exhibits reduced anthocyanin leaching, moisture loss, gas exchange, or nutrients loss compared to a plant, fruit, vegetable, or part thereof that is not coated with the composition. In some embodiments, the plant, fruit, vegetable, or part thereof coated with the composition exhibits reduced weight loss after thawing compared to a plant, fruit, vegetable, or part thereof that is not coated with the composition.

Methods for treating a plant, fruit, vegetable, or part thereof also are disclosed. In some embodiments, the method comprises substantially coating the plant, fruit, vegetable, or part thereof with a composition embodiment disclosed herein before or after the plant, fruit, vegetable, or part thereof is harvested. The plant, fruit, vegetable, or part thereof can be substantially coated with the composition by spraying, dipping, enrobing, or combinations thereof. In some embodiments, the method further comprises processing the plant, fruit, vegetable, or part thereof to prevent or mitigate leaching of anthocyanins, nutrients, pigments, or combinations thereof in the plant, fruit, vegetable, or part thereof. Processing the plant, fruit, vegetable, or part thereof can comprise thermal processing at a temperature of at least 80° C. In some embodiments, the method can further comprise washing the plant, fruit, vegetable, or part thereof after processing to substantially remove the composition. Such method embodiments can further comprise performing an additional thermal processing step after the plant, fruit, vegetable, or part thereof is washed. In some embodiments, processing the plant, fruit, vegetable, or part thereof can comprise freezing the plant, fruit, vegetable, or part thereof substantially coated with the composition.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is an image of uncoated blueberries; FIG. 1B is an image of blueberries that were coated with a composition comprising 1% cellulose nanofibrils prior to the first thermal processing step; FIG. 1C is an image of blueberries coated with a composition comprising 1% cellulose nanofibrils and 0.01% nano-calcium carbonate (NCC) prior to the first thermal processing step; FIG. 1D is an image of blueberries coated with a composition comprising 1% cellulose nanofibrils, the coating being applied by spray coating prior to the first thermal processing step; and FIG. 1E is an image of blueberries coated with a composition comprising 1% cellulose nanofibrils and 0.01% NCC, the coating being applied by spray coating prior to the first thermal processing step.

FIG. 2A is an image of blueberries after thermal processing at 80° C. for 20 minutes, with the blueberries being coated with CNF prior to thermal processing; FIG. 2B is an image of the blueberries illustrated in FIG. 2A after the coating was removed and the blueberries were subjected to another thermal process at 65° C. for 15 minutes; and FIG. 2C is an image of the blueberries of FIGS. 2A and 2B after being stored in water for one day in ambient conditions.

FIG. 5A illustrates non-coated apples and FIG. 5B is an image of apple rings coated with a composition comprising 1% cellulose nanofibrils and 0.01% NCC.

FIGS. 7A-7E are microscope images (magnified by 10×) illustrating the microstructures of various types of films under UV light. FIG. 7A illustrates a film comprising carboxymethyl cellulose; FIG. 7B is an image of a film comprising 0.188% cellulose nanofibrils; FIG. 7C is an image of a film comprising 0.188% cellulose nanofibrils and 0.01% NCC; FIG. 7D is an image of a film comprising 0.375% cellulose nanofibrils; and FIG. 7E is an image of a film comprising 0.375% cellulose nanofibrils and 0.01% NCC.

FIG. 8 is a bar graph of fluence (mJ/cm$^2$) measurements obtained upon irradiation of the surface of cylindrical vessels containing 0.6 M KI, 0.1 M KIO$_3$, and 0.01 M Na$_2$B$_4$O$_7$.10H$_2$O (n=2; mean values). Results are provided for vessels without films (control), vessels covered with a carboxymethyl cellulose film, and vessels having films formed using embodiments of the disclosed composition. Different letters on the bar represent significant difference ($P<0.05$) of UV fluence.

FIG. 10A is an image of an uncoated apple; FIG. 10B is an image of an apple coated with a composition comprising 1% cellulose nanofibrils; FIG. 10C is an image of an apple coated with a composition comprising 1% cellulose nanofibrils and 0.01% NCC; FIG. 10D is an image of an apple coated with a composition comprising 1% cellulose nanofibrils, applied by spray coating; and FIG. 10E is an image of an apple coated with a composition comprising 1% cellulose nanofibrils and 0.01% NCC, applied by spray coating.

DETAILED DESCRIPTION

Figure 1A:
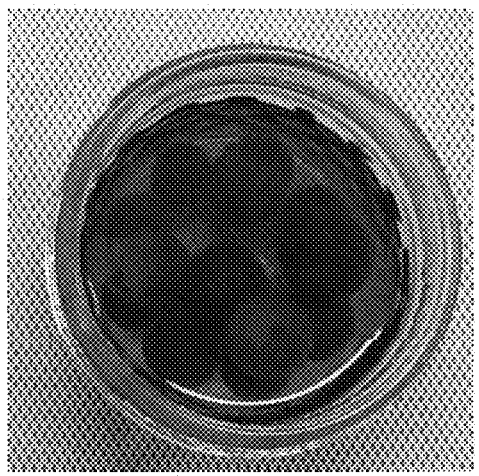
FIGS. 1A-1E are photographic images of blueberries after performing two thermal processing steps, film removal, and one day of storage in packing water in ambient conditions.
Figure 1B:
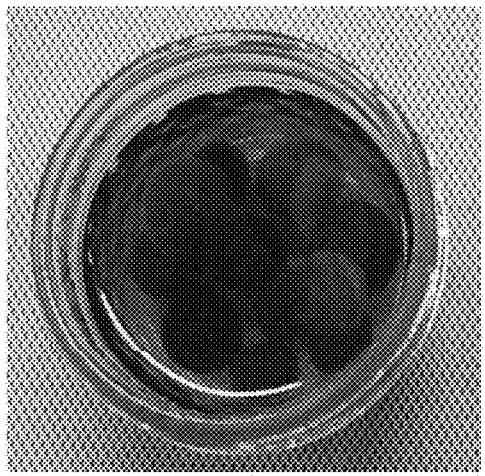
Figure 1C:
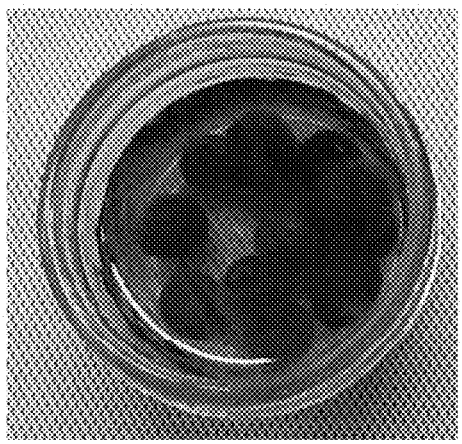
Figure 1D:
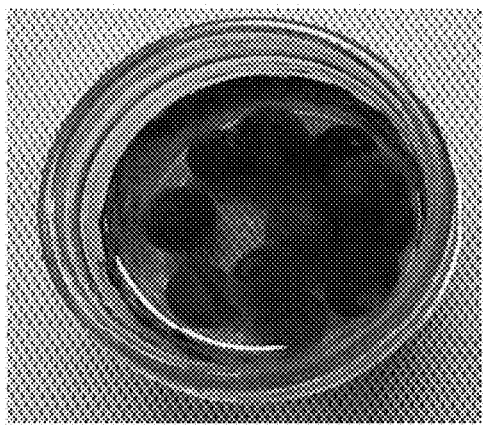
Figure 1E:
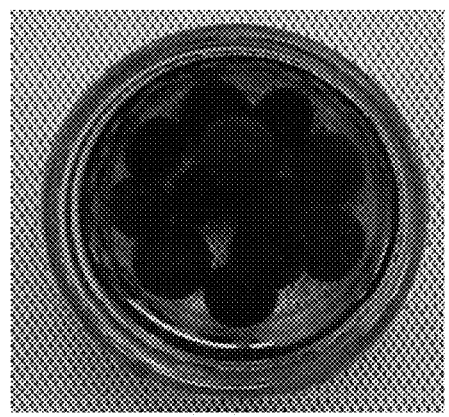

The nano-cellulose coatings described herein mitigate the leaching of pigments and nutrients in fresh and processed fruits and vegetables. In methods described herein we have prepared aqueous suspension slurries of fibrous or crystalline nano-cellulose coatings that form a durable, inert, water-resistant coating over the foodstuff. The coatings formed from the suspensions/slurries with the addition of other ingredients, including, but not limited to, plasticizers, minerals, chitosan, protein, antimicrobial and antioxidant agents, and other functional ingredients when applied will protect foodstuffs from water loss, protect from sunburn damage and protect from the loss of physical integrity, all of which are responsible for significant quality deterioration, microbial spoilage and monetary losses to the food industry. The nano-cellulose coating is aqueous in nature, and thus does not require waxes, oils or other solvents to apply, and it is based on edible cellulose. The coating solution is formulated with ingredients that are commonly found in food (e.g. cellulose, calcium carbonate, water, glycerin, etc.) and it has the potential to allay consumer concerns over food safety.

Described herein are materials comprising cellulose nanofibrils (CNF) and nano calcium carbonate (NCC). Cellulose nanomaterial is cellulosic material comprising linear chains of one hundred to over ten thousand P-0-glucopyranose units linked by glucosidic bonds at their C1 and C4 positions, with any external dimension in the nanoscale or having internal structure or surface structure in the nanoscale. Cellulose nanomaterials are composed in whole or in part of cellulose nanofibril (CNF) or cellulose nanocrystal (CNC), which can be present in a mixture with cellulose microcrystal (CMC) or cellulose microfibril (CMF).

In the methods reported here, the nanofibril (CNF) structure and compound properties have been adjusted to provide a type of cellulose nanofiber that contains both crystalline regions and amorphous regions, with dimensions of 3 to several hundred nm in width, aspect ratio greater than 50 (for CNF) or 10 (for CNC), reminiscent of elementary fibrils in plant cell walls. There are many methods used in the preparation of CNF, e.g. fibrillation with or without chemical pretreatment in the mechanical refining of cellulose derived from wood fiber or non-wood plant fiber, and may or may not contain residual hemicelluloses. In some embodiments, the method of preparing CNFs can include fibrillation methods with or without chemical pretreatment in the mechanical refining of cellulose such as, but not limited to wood fiber or non-wood plant fiber, and may or may not contain residual hemicelluloses. The primary attribute of the disclosed CNFs and CNCs useful for this invention is that they form an acceptably clear, water-resistant coating.

Based on the foundation of nanocellulose films, the utilization of nanoscale mineral fillers for UV protection also is disclosed. Thus, described herein are materials comprising nanoparticles, nanodots or nanopowder calcium carbonate (NCC) that are cubic and high surface area particles. NCC has a particle size of 60-100 nm when examined by Scanning Electron Microscopy (SEM). Existing applications for NCC has focused on use as an agricultural additive, in drug delivery by loading them with hydrophilic protein-based drugs and for their potential imaging, biomedical and bioscience properties and for use in coatings, plastics, nanowire, and in alloy and catalyst applications.

Also intended is the incorporation of additional agents for the stabilization and retention of anthocyanins in fruits, vegetables, and other foods during processing to provide for enhanced shelf life, storage, and consumer appeal. Examples of the agents useful in the disclosed compositions include: phenolics (such as, but not limited to tannic acid and other phenolic acids); acids (such as, but not limited to formic acid and citric acid); crosslinking agents (such as, but not limited to sodium trimetaphosphate (food grade crosslinking agent) and pyruvic acid); and metal ions (such as, but not limited to food-grade stannous (Sn) chloride). When applied to the surface of fruits, vegetables and other foods, cellulosic coating solutions form a strong external barrier after drying. The nanocellulose-based coating mitigates the loss of color appearance and physical integrity associated with the leaching of pigments, nutrients, and water-soluble compounds into surrounding water or other aqueous solution and when subjected to the heat, pressure, and other effects of the foodstuff preparation and processing. This barrier prevents or greatly lessens the leaching of bioactive pigments/nutrients during thermal or other types of processing. NCC is useful as an anti-transpirant, to prevent water loss in produce before and after harvest.

The compositions disclosed herein can be used to prevent pigments/nutrients leaching from other fruits and/or vegetables other than those expressly disclosed herein. The compositions also can be used to for reducing water loss/gain for foodstuffs (baked goods, such as cookies; candies; and other confections) during storage. Also contemplated herein are compositions that are useful to reduce gas (e.g., $O_2$ and $CO_2$) exchanges of various foods with air in the environment. The present disclosure also concerns uses of the disclosed compositions in applications, such as modifying the physical properties of biodegradable products such as boards, films and packages, including: increased resistance to degradation; improved barrier properties; and improved strength. The compositions also can be used to make protective coatings for durable materials to present damage during transit and handling.

In another embodiment described herein, films and other flexible packages made from aqueous solutions/slurries of fibrous or crystalline nano-cellulose are extremely water resistant and strong. Films and other flexible packages comprising combinations of nano-cellulose and other existing film forming materials (including, but not limited to: chitosan, protein and fruit/veg puree) provide improved water resistance and barrier properties while retaining the unique functionality of the non cellulose materials. The nano-cellulose coatings protect objects from water loss due to transpiration and/or freeze-thaw related drip loss and allows for improved water resistance and barrier properties while retaining the unique functionality of the non cellulose materials.

EXAMPLES

Example 1

In one embodiment, cellulose nanofibrils (CNF) comprising both crystalline regions and amorphous regions are described, with dimensions of 3 to several hundred nm in width, aspect ratio greater than 50, reminiscent of elementary fibrils in plant cell walls.

The method of preparation of CNF are formed by fibrillation methods with or without chemical pretreatment in the mechanical refining of cellulose such as, but not limited to wood fiber or non-wood plant fiber, and may or may not contain residual hemicelluloses.

Nanoparticles, nanodots or nanopowder calcium carbonate (NCC) are cubic and high surface area particles. Nanoform calcium carbonate has a particle size of 60-100 nm when examined by Scanning Electron Microscopy (SEM). Existing applications for NCC has focused on use in drug delivery by loading them with hydrophilic protein-based drugs and for their potential imaging, biomedical and bioscience properties and for use in coatings, plastics, nanowire, and in alloy and catalyst applications Table 1 provides the formulations of CNF and NCC coating and film-forming solutions used in certain embodiments disclosed herein. The given amount of CNF and/or NCC was dissolved in deionized water and then homogenized using a homogenizer for reaching complete dissolution of CNF and CNN at ambient conditions.

TABLE 1

Formulation of CNF and NCC coating and film-forming solutions.

| Code | Formulation† |
|---|---|
| NF316 | 0.188% CNF |
| NF316C | 0.188% CNF with 0.01% NCC |
| NF38 | 0.375% CNF |
| NF38C | 0.375% CNF with 0.01% NCC |
| NF34 | 0.750% CNF |
| NF34C | 0.750% CNF with 0.01% NCC |
| NF 1 | 1% CNF |
| NF 1C | 1% CNF with 0.01% NCC |
| NF 1S | 1% CNF by spray coating |
| NF 1CS | 1% CNF with 0.01% NCC by spray coating |
| CMC | Carboxymethyl cellulose |

†All formulations were prepared by dispersing the components in deionized water.

Example 2

Coating of blueberries with aqueous slurries of 1-2% cellulose nanofibrils as described in Table 1, with and without the addition of nano calcium carbonate, virtually eliminated the leakage of anthocyanin pigments (compared with a control) from blueberries during thermal processing analogous to that seen in the industry. Results are discussed below.

Example 3

In another embodiment described herein, the prevention of pigment/nutrient leaching from blueberry fruits is disclosed. During thermal processing, bioactive pigments and nutrients (e.g. anthocyanins) can be leached from the fruit into the surrounding aqueous media, typically water or low sugar solution, causing a change in appearance (loss of natural fruit pigments) and possible nutritional losses.

Blueberries were coated with different CNF and NCC solutions as described in Table 1 by either dipping fruit in coating solution (dipping blueberries in the coating solution for 1 minute and then dried at room conditions) or spray-coating (coating solution was sprayed on the surface of blueberries under 30 psi pressure and then dried at room conditions). Non-coated and coated blueberries were packed in glass jars (50 ml) filled up with distilled water, put inside a water bath with controlled temperature, and then subjected to three process conditions: 1) heating at 80° C. for 20 minutes; 2) heat at 65° C. for 15 minutes; and 3) a sequence of conditions (1) and (2). To determine whether CNF coatings could prevent this phenomenon, colors and anthocyanin content in the packing water after thermal processing of the blueberries were tested. The color of packing water was measured by UV spectrophotometer at 525 nm (Shimadzu, Japan). For measuring monomeric anthocyanin of the packing water, a method by Giusti and Wrolstad (2001) was used to measure the monomeric anthocyanin content of the packing water. See, Giusti, Monica M., and Ronald E. Wrolstad, "Characterization and Measurement of Anthocyanins by Uv-Visible Spectroscopy," In Current Protocols in Food Analytical Chemistry, edited by Ronald E. Wrolstad, F1.2.1-F1.2.13. New Jersey: John Wiley & Sons, Inc., 2001, which is incorporated herein by reference in its entirety. After the first thermal process (80° C. for 20 minutes), coating was removed from the surface of fruits by washing using tap water, uncoated fruit were then subjected to the second thermal treatment (65° C. for 15 minutes) to examine whether the protective effect would remain.

Figure 2A:
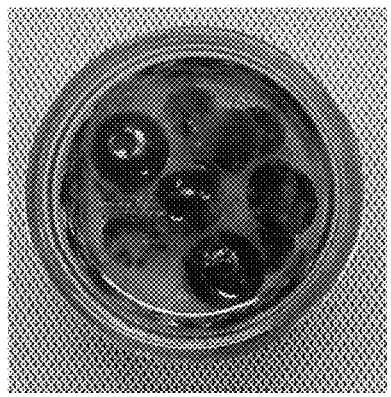
FIGS. 2A-2C are photographic images of blueberries coated with different composition embodiments disclosed herein after different thermal processes.
Figure 2B:
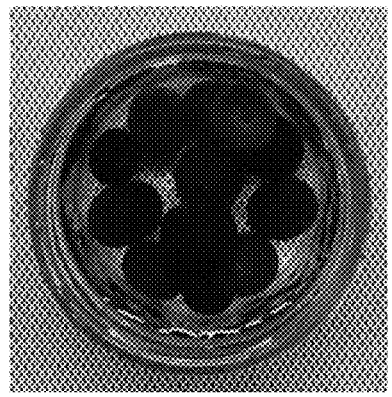
Figure 2C:
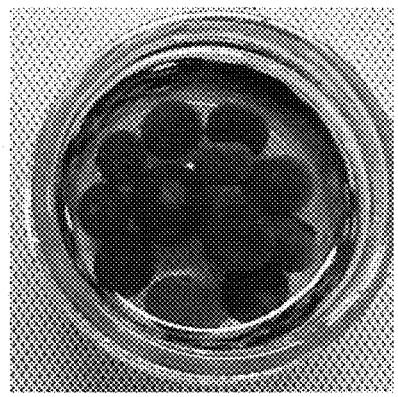
Figure 3:
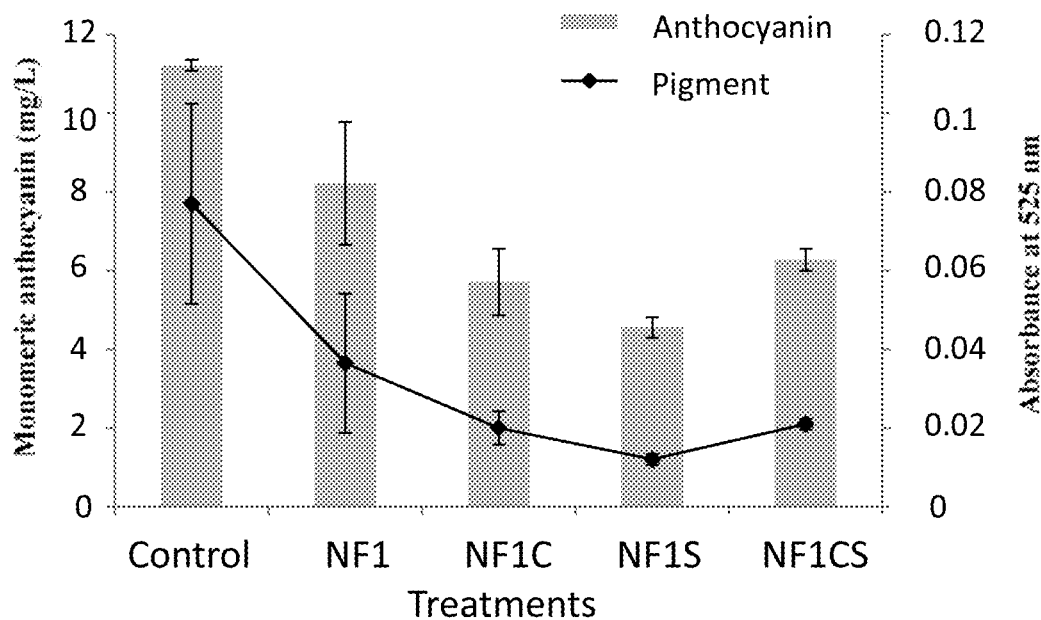
FIG. 3 is a graph of monomeric anthocyanin concentration (mg/L) and pigment absorbance (measured at 525 nm) leached from coated and uncoated blueberries after processing (80° C. for 20 minutes) and cooling (20 minutes).
Figure 4:
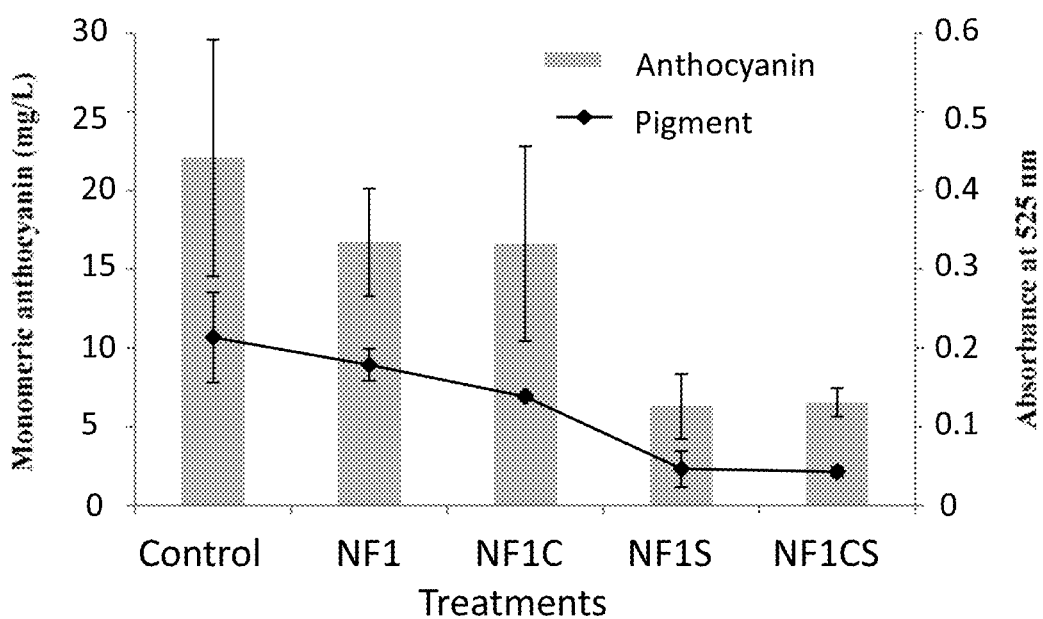
FIG. 4 is a graph of monomeric anthocyanin concentration (mg/L) and pigment absorbance (measured at 525 nm) leached from processed blueberries (65° C. for 15 minutes) after one day of storage in ambient conditions.

FIGS. 1A-1E illustrate that the leaching of pigments/anthocyanin was eliminated or greatly reduced by the CNF/NCC coatings, compared with uncoated blueberries (control). Even after the coating was removed after the first thermal treatment, pigment leaching was negligible after the 2nd stage of thermal treatment, as illustrated in FIGS. 2A-2C. Further, the coating formulations containing NCC showed lower levels of leaching compared to those without as shown in FIGS. 3 and 4. Method of coating application also had a marked effect, with spray-coating applications performing markedly better than analogous dipped coating applications, showing significantly lower contents of pigments and anthocyanin in packing solutions.

Example 4

In another embodiment described herein are formulations of compounds useful as food coatings and in preparation of frozen foods to prevent drip loss and in maintain integrity during thawing. Foodstuffs experience significant water loss during the freezing and thawing process due to syneresis (i.e., water loss after thawing) and evaporation.

Apples were peeled, cored and cut into slices of uniform thickness. The resultant slices were then dipped in CNF coating solutions or left uncoated prior to freezing in a forced air freezer (−20° C. for 24 hours). Afterwards, the samples were removed from the freezer and allowed to thaw at ambient temperature (18-23° C. for about 6 hours. Measurements were taken of both the change in mass during freezing (condensation) and the total amount of liquid exuded from the thawing apples (syneresis and evaporation).

Figure 5A:
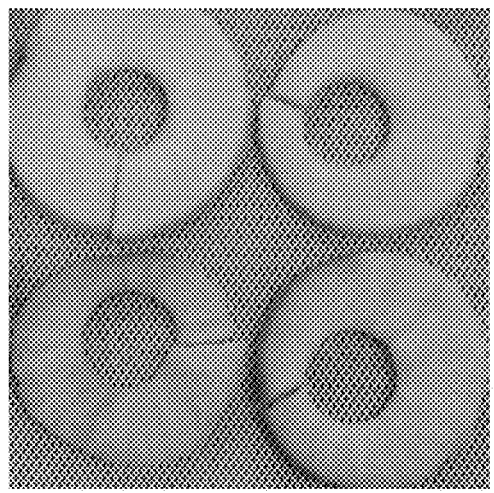
FIGS. 5A and 5B are photographic images illustrating the appearance of uncoated and coated apple rings after freezing processes.
Figure 5B:
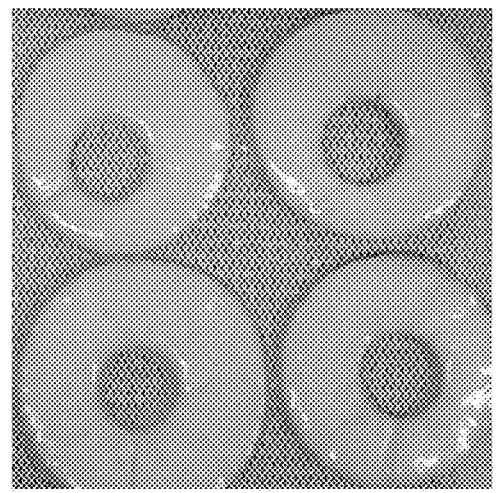

Overall, the total weight loss (%) after thawing of coated apple slices was lower than that of uncoated apples shown in Table 2. Additionally, it was found that the condensation which formed on the thawing apples due to ambient humidity in the thawing room was higher on the uncoated slices (FIG. 5A) compared to the coated ones (FIG. 5B). As can be seen by comparing FIGS. 5A and 5B, uncoated apples appeared more desiccated due to higher levels of moisture loss compared with coated samples.

TABLE 2

Comparison of condensation (%) and weight loss (%) between non-coated and CNF coated fresh-cut apples

| | Parameters | |
|---|---|---|
| Treatments | Condensation (%) | Weight loss (%) |
| Non-coated apples | 8.87 ± 1.19 | 21.09 ± 3.54 |
| NF1 | 6.48 ± 0.51 | 17.33 ± 2.38 |
| NF1C0.01 | 6.28 ± 0.53 | 17.94 ± 2.54 |

Example 5

In another embodiment described herein are the methods to prepare CNF flexible, water-resistant films useful as an edible food packaging wrap that may be applied for packaging wide varieties of food products. The majority of flexible packaging materials in the food industry are petroleum-derived polymers. Their lack of sustainability and concerns over toxic residues result in decreased appeal to consumers. Instead, alternate natural materials (e.g. cellulose and chitosan) lack water-resistance.

Solutions comprising 0.188 and 0.375% CNF were prepared, casted in Teflon-coated glass plate, and dried at room temperature for 72-96 hours (Chen and Zhao, 2012). See, Chen, J. and Zhao, Y., "Effect of molecular weight, acid, and plasticizer on the physicochemical and antibacterial properties of beta-chitosan based films," J. Food Sci. 77(5), E127-136, which is incorporated herein by reference in its entirety. A 1% CMC solution was also prepared to make films as a comparison with our CNF films. Prepared films were conditioned for 48 hours in a 25° C. and 50% relative humidity (RH) environmental chamber. Conditioned film samples were tested for moisture content, water solubility, and water-vapor transmission rate (WVTR), as well as tensile strength and elongation. Moisture content of the films was determined by the percentage weight loss of film samples after drying in a forced-air oven at 100° C. for 24 hours. Water solubility was determined by the percentage weight loss of films samples after suspension in water for 24 hours and dried at 40° C. for 24 hours, whereas CMC film was only tested for 2 hours due to its hydrophilicity. WVTR was measured by the cup method at 25° C. and 100/50% RH gradient, following ASTM Standard Method E96-87 (ASTM, 2000). Tensile strength (TS) and percent elongation at the break (EL) of the films were determined according to ASTM 0882 (ASTM, 2001) and analyzed using a texture analyzer (TA.XT2i, Texture Technologies Corp., USA) by following the same procedures as Park and Zhao (2004). See, Park, Su-il, and Yanyun Zhao, "Incorporation of a High Concentration of Mineral or Vitamin into Chitosan-Based Films," Journal of Agricultural and Food Chemistry 52, no. 7 (2004): 1933-1939, which is incorporated herein by reference in its entirety.

Figure 6:
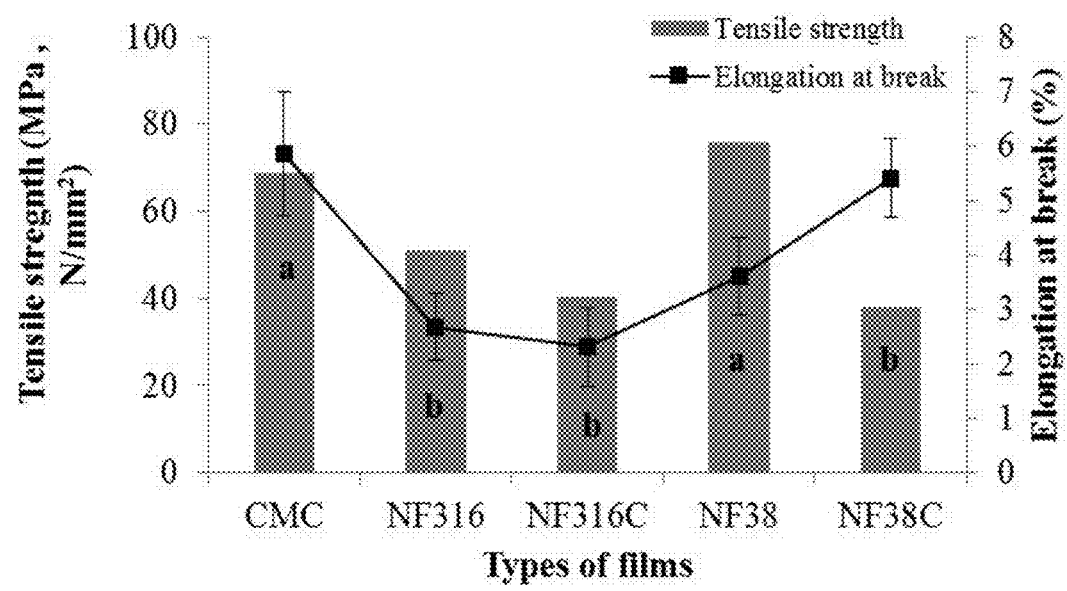
FIG. 6 is a graph of tensile strength (MPa, N/mm$^2$) and elongation at break (%) illustrating results obtained from analyzing films of carboxymethyl cellulose and films made using various embodiments of the disclosed composition. The different letters provided on the bars in FIG. 6 represent significant difference ($P<0.05$) of tensile strength.

Overall, the physicochemical properties of CNF films were significantly better than CMC films, indicating the former had a higher level of water-resistance as shown in Table 3. Tensile strength and elongation provided interesting results, with the CMC film showing the greatest elongation and the second highest tensile strength, being surpassed slightly by films of formulation NF38, as shown in FIG. 6. These differences are likely related to the differences in the concentration and resultant film thickness, as the CMC solution had more than twice the concentration, and resulted in a much thicker film (0.083 mm) than NF38 (0.019 mm) as shown in Table 3. Microstructure tests showed that adding NCC into CNF films significantly improved the homogeneity of the films as can be seen by comparing FIGS. 7B and 7D with FIGS. 7C and 7E. All films have a very homogeneous structure, and NCC is very evenly distributed in the film matrix of the samples illustrated in FIGS. 7C and 7E (visible as pink dots in the colored version of these figures).

TABLE 3

Moisture contents (MC, %), water solubility (Ws, %), and water vapor transmission rate (WVTR, g mm/d m$^2$) for various types of films.

| Types of film | Measured parameters | | | |
|---|---|---|---|---|
| | MC | Film Thickness | Ws | WVTR |
| CMC* | 15.865 $^a$ | 0.083 | 62.067 $^a$ | 131.840 $^a$ |
| NF316** | 4.206 $^c$ | 0.014 | 0.123 $^b$ | 13.186 $^b$ |
| NF316C*** | 4.266 $^c$ | 0.014 | 0.240 $^b$ | 22.818 $^b$ |

TABLE 3-continued

Moisture contents (MC, %), water solubility (Ws, %), and water vapor transmission rate (WVTR, g mm/d m$^2$) for various types of films.

| Types of film | Measured parameters | | | |
|---|---|---|---|---|
| | MC | Film Thickness | Ws | WVTR |
| NF38$^+$ | 6.016 $^b$ | 0.019 | 0.176 $^b$ | 24.948 $^b$ |
| NF38C$^{++}$ | 5.905 $^b$ | 0.030 | 0.216 $^b$ | 25.391 $^b$ |

*1% carboxymethyl cellulose
**0.188% cellulose nanofibrils
***0.188% cellulose nanofibrils added with 0.01% CaCO$_3$
$^+$0.375% cellulose nanofibrils
$^{++}$0.375% cellulose nanofibrils added with 0.01% CaCO$_3$
Means preceded by the same letter in the same column within same experiment were not significantly different (P > 0.05).

Example 6

In another embodiment described herein are the methods providing UV sunburn protection within CNF/NCC coatings and films before and after harvest. Exposure to high levels of UV light can damage maturing produce, resulting in visibly discolored spots, destroying phytochemical compounds, and providing a foothold for spoilage organisms to grow.

UV protective films with CMC and CNF solutions were prepared following the same procedures described above and used to cover the top of cylindrical acrylic vessels containing 10 ml buffered liquid dosimetry solution (0.6 M KI, 0.1 M KIO$_3$, and 0.01 M Na$_2$B$_4$O$_7$.10H$_2$O). Fluence measurements (mJ/cm$^2$) were obtained by subjecting the vessels to ultra violet light for a fixed time and then measuring the change in the absorbance of the solution at 352 nm, as shown in FIG. 8. Transmittance of visible and UV light was also determined using spectrophotometry at 620 nm and 280 nm. Additionally, coating solutions were applied to whole apples (Malus domestica, var. golden delicious) using either spraying or dipping methods. After the coatings had dried, the samples, plus uncoated samples were placed in under a 10 W UV source for 1.5 hours to induce UV damage. Samples were stored at ambient temperature for 12 days and periodically assayed for color and weight loss (%), and photographed to record changes in appearance.

Figure 9:
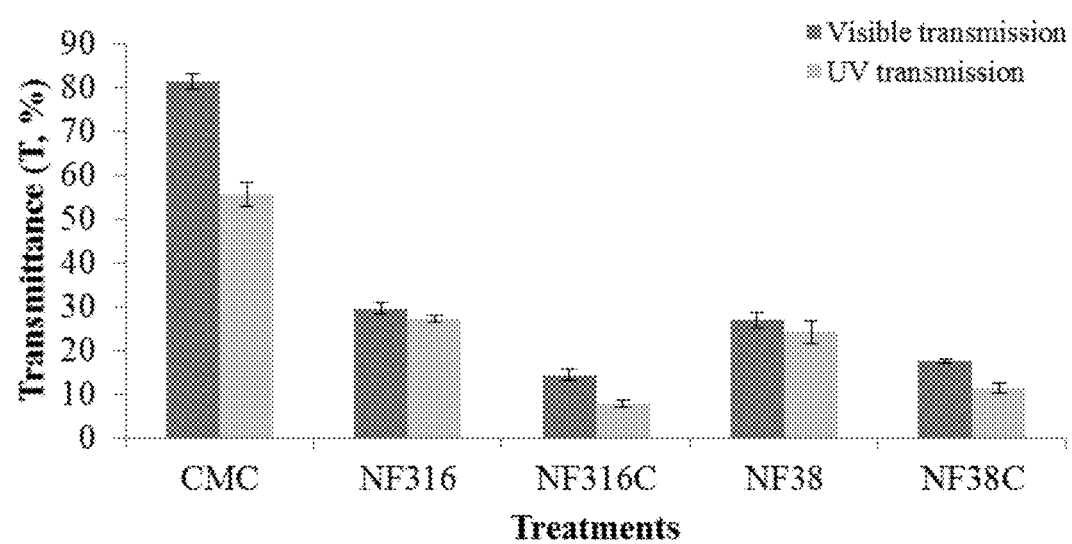
FIG. 9 is a bar graph of transmittance (T, %) of visible (measured at 620 nm) or UV (measured at 280 nm) light transmissions passing through various types of films disclosed herein (n=3, mean values).
Figure 10A:
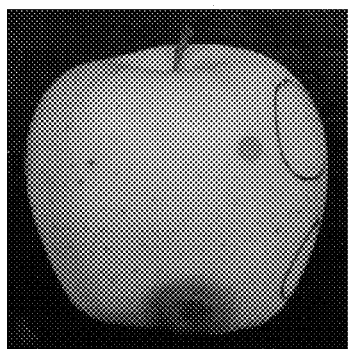
FIGS. 10A-10E are photographic images of treated apples after UV exposure and storage.
Figure 10B:
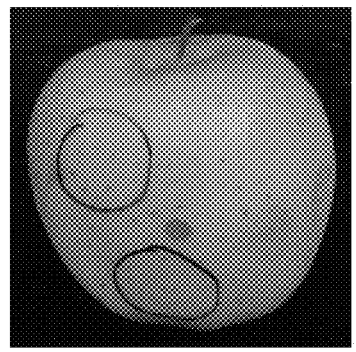
Figure 10C:
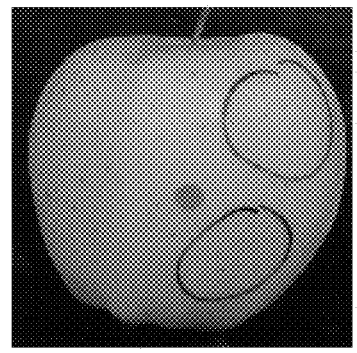
Figure 10D:
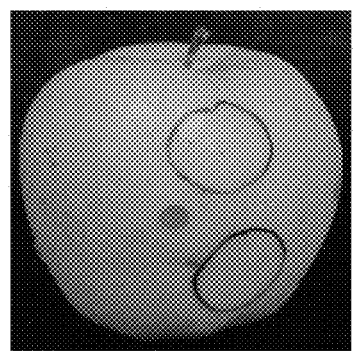
Figure 10E:
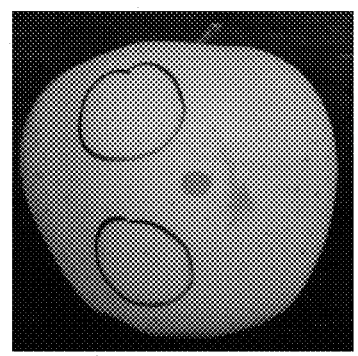

All films showed a significant reduction in the fluence of UV light, with CNF films outperforming the CMC film as shown in FIG. 8. The transmittance (%) of both visible and UV light were quite high for CMC films (81.4 and 55.7%, respectively), compared to the transmittance through the CNF-based films, which ranged from 14.4 to 29.5% for visible light and 7.9-27.3% for UV as shown in FIG. 9. The addition of NCC to a given formulation provided for marked decreases in transmittance (%) of visible and UV light, reducing them by as much as a third or more. Treated apples had no significant difference in color before and after coating, but after UV exposure and storage significant increases were observed in the color intensity (chroma) between the uncoated "control" apples and the apples coated with all but one formulation (NF1C) described in Table 4. See also FIGS. 10A-10E, which illustrate the appearance of uncoated (FIG. 10A) and coated apples (FIGS. 10B-10E) after being exposed to UV light for 1.5 hours after 12 days. Significant increases were observed in the color intensity (Chroma) for the coated apples. In all but one case (NF1C), no change in weight loss (%) was found. It must be noted that this is likely due to the relatively short storage time and the great degree of variation within sample groups.

TABLE 4

Comparison of ΔL, ΔE, Δhue, Δchroma, and weight loss (%) between non-coated and coated whole apples for 12 days†

|  | ΔL | Δhue | Δchroma | ΔE | Weight loss (%) |
|---|---|---|---|---|---|
| Control | −3.067 | 0.249 | 10.399 | 14.83 | 5.67 |
| NF1* | −3.133 | −0.635 | 6.519 (*) | 11.58 (*) | 5.16 |
| NF1C** | −1.767 (*) | 1.293 | 6.372 (*) | 11.37 | 4.35 (*) |
| NF1S+ | −2.867 | −3.630 | 5.410 (*) | 12.22 | 4.92 |
| NF1CS++ | −3.100 | 0.568 | 6.700 (*) | 11.68 | 5.11 |

†Mean values (n = 6), values followed by an asterix (*) denote significant difference from the control value, as determined by t-testing (α = 0.05)
*1% cellulose nanofibrils
**1% cellulose nanofibrils added with 0.01% $CaCO_3$
+1% cellulose nanofibrils by spray coating
++1% cellulose nanofibrils added with 0.01% $CaCO_3$ by spray coating In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A plant, fruit, vegetable, or part thereof, coated with a film formed from a composition comprising 0.188 wt % to 2 wt % of a cellulose nanomaterial comprising cellulose nanofibrils, cellulose nanocrystals, or a combination thereof and further comprising cellulose microfibrils, cellulose microcrystals, or a combination thereof; wherein the film formed from the composition prevents or mitigates pre- and/or post-harvest damage in the plant, fruit, vegetable, or part thereof.

2. The plant, fruit, vegetable, or part thereof of claim 1, wherein the composition further comprises a phenolic compound, a crosslinking agent, an acid, a metal ion, or combinations thereof.

3. The plant, fruit, vegetable, or part thereof of claim 1, wherein the composition further comprises a film-forming material, a plasticizer, an antimicrobial agent, an antioxidant agent, or combinations thereof.

4. The plant, fruit, vegetable, or part thereof of claim 1, wherein the composition further comprises chitosan, a protein, fruit or vegetable puree, or combinations thereof.

5. The plant, fruit, vegetable, or part thereof of claim 1, wherein the composition is edible.

6. The plant, fruit, vegetable, or part thereof of claim 1, wherein the composition further comprises a crosslinking agent.

7. The plant, fruit, vegetable, or part thereof of claim 1, wherein the film prevents or mitigates leaching of anthocyanins, pigments, nutrients, water soluble compounds or combinations thereof from the plant, fruit, vegetable, or part thereof.

8. The plant, fruit, vegetable, or part thereof of claim 1, wherein the film prevents or mitigates weight loss and/or UV damage of the plant, fruit, vegetable, or part thereof.

9. The plant, fruit, vegetable or part thereof of claim 1, wherein the fruit is a blueberry, a cherry, or an apple.

10. The plant, fruit, vegetable, or part thereof of claim 1, wherein the plant, fruit, vegetable, or part thereof exhibits reduced anthocyanin leaching, nutrient leaching, moisture loss, or gas exchange compared to a plant, fruit, vegetable, or part thereof that is not coated with the composition.

11. The plant, fruit, or vegetable of claim 1, wherein plant, fruit, vegetable, or part thereof exhibits reduced weight loss after thawing compared to a plant, fruit, vegetable, or part thereof that is not coated with the composition.

12. A method of treating a plant, fruit, vegetable, or part thereof, comprising coating the plant, fruit, vegetable, or part thereof, before or after the plant, fruit, vegetable, or part thereof is harvested, with a composition comprising 0.188 wt % to 2 wt % of a cellulose nanomaterial comprising cellulose nanofibrils, cellulose nanocrystals, or a combination thereof and further comprising cellulose microfibrils, cellulose microcrystals, or a combination thereof to provide a film that prevents or mitigates pre- and/or post-harvest damage in the plant, fruit, vegetable, or part thereof.

13. The method of claim 12, wherein the plant, fruit, vegetable, or part thereof is coated with the composition by spraying, dipping, enrobing, or combinations thereof.

14. The method of claim 12, wherein the method further comprises processing the plant, fruit, vegetable, or part thereof to prevent or mitigate leaching of anthocyanins, nutrients, pigments, or combinations thereof in the plant, fruit, vegetable, or part thereof.

15. The method of claim 14, wherein processing the plant, fruit, vegetable, or part thereof comprises thermal processing at a temperature of at least 80° C.

16. The method of claim 15, wherein the method further comprises washing the plant, fruit, vegetable, or part thereof after processing to remove the film.

17. The method of claim 16, wherein the method further comprises performing an additional thermal processing step after the plant, fruit, vegetable, or part thereof is washed.

18. The method of claim 12, wherein processing the plant, fruit, vegetable, or part thereof comprises freezing the plant, fruit, vegetable, or part thereof coated with the composition.

19. A method for processing a coated plant, fruit, vegetable, or part thereof, comprising thermally processing the coated plant, fruit, vegetable, or part thereof at a temperature of at least 80° C., which coated plant, fruit, vegetable, or part thereof is coated with a film formed by a composition comprising 0.188 wt % to 2 wt % of a cellulose nanomaterial comprising cellulose nanofibrils, cellulose nanocrystals, or a combination thereof and further comprising cellulose microfibrils, cellulose microcrystals, or a combination thereof.

* * * * *